United States Patent Office 2,971,848
Patented Feb. 14, 1961

2,971,848

ARTIFICIAL SWEETENING PRODUCT

Emery Polya, Tarrytown, N.Y., assignor to General Foods Corporation, White Plains, N.Y., a corporation of Delaware No Drawing. Filed May 12, 1958, Ser. No. 734,427

3 Claims. (Cl. 99—141)

This invention relates to low-calorie sweetened edible products.

The use of artificial sweeteners such as saccharin sodium in combination with sodium and/or calcium cyclamate to obtain a desirable sweetness level in food and edible products generally has become rather commonplace. Various workers in the art have concluded that the salts of cyclamate (cyclohexylsulfamic acid) serve in combination with a physiologically acceptable salt of saccharin to provide a satisfactory sweetness level while at the same time avoiding to some extent an undesirable bitter or medicinal after-taste which usually accompanies the use of high levels of saccharin alone. However, while the use of such artificial sweeteners singly or in combination has gained considerable commercial success, the factors of bitterness and medicinal after-taste still prevail to an undesirable extent. Furthermore, these limitations of artificial sweeteners prevail when attempting to provide a tart flavor by employing various edible food acids such as citric acid therewith.

It is an object of this invention to provide artificially sweetened edible products having a tart flavor free of any objectionable bitter or medicinal after-taste.

It has now been discovered that when adipic acid is employed in combination with the artificial sweeteners cyclamate and saccharin to produce a high sweetness level and tart character in food and like products, there is no objectionable bitter or medicinal character noticeable in the product. It appears adipic acid, by virtue of its organoleptic properties, is capable of masking any bitter or medicinal after-taste caused by such artificial sweeteners and in addition enhances the sweetness effect accomplished by using them. The preferred artificial sweetener is sodium saccharin in combination with a cyclamate selected from the group consisting of calcium cyclamate and sodium cyclamate.

Among the uses of the present invention which are contemplated are the enhancement of various dietetic food products, canned or preserved fruits, beverages, and the like, as well as orally administered pharmaceuticals, in which a sweet taste is an important consideration.

In the case of gelatin jelly desserts the virtues of adipic acid in combination with cyclamate and saccharin are highly significant. In general, gelatin jelly dessert products which are fruit flavored should have a very sweet as well as a tart taste. Tartness is usually imparted by such edible food acids as citric acid. It has been found that when adipic acid is employed in combination with the artificial sweeteners cyclamate and saccharin the sweetness contribution of the adipic acid in combination with the cyclamate and saccharin offers an improved fruit-like tart flavor of increased sweetness and no bitter or medicinal after-taste is noticed.

The invention will not be described in terms of a specific example:

*Example 1*

A gelatin jelly dessert product was prepared having the following formulation:

| Ingredients: | Parts by weight |
|---|---|
| Adipic acid | 0.7 |
| Gelatin | 4.0–5.0 |
| Mono- and disodium phosphate | 0.3 |
| Sodium cyclamate (Sucaryl) | 0.14 |
| Sodium saccharin | 0.04 |
| Color (strawberry) | 0.28 |
| Flavor (strawberry) | 0.16 |

To between six and seven grams of the aforesaid dry mix 237 mls. (1 cup) hot water was added. The gelatin dessert solution was then allowed to gel and when tasted had a desirable sweet and tart strawberry flavor. When consumed the product failed to have any objectionable bitter or medicinal after-taste, there was no lingering astringent feeling in the mouth and the product had a high sweetness. As distinguished from the use of other edible food acids, it was observed that the adipic acid retained much of its original tartness despite the presence of artificial sweeteners and also functioned to impart higher sweetness as well as mask the aforesaid bitter or medicinal after-taste.

In addition to the aforementioned phenomena it has been observed that the adipic acid serves to allow one to reduce the level of artificial sweeteners needed to be used in order to achieve a particular sweetness level. Since adipic acid is considerably less expensive than saccharin and cyclamate, this results in a saving in the total cost of ingredients required.

What is claimed is:

1. An edible product containing as an artificial sweetener cyclamate, saccharin and adipic acid.

2. An edible product comprising sodium saccharin, a cyclamate selected from the group consisting of calcium cyclamate and sodium cyclamate, and adipic acid.

3. An edible product containing gelatin, sodium saccharin, a cyclamate selected from the group consisting of calcium cyclamate and sodium cyclamate, and adipic acid.

References Cited in the file of this patent

UNITED STATES PATENTS

| 2,653,105 | Gordon | Sept. 22, 1953 |
| 2,657,996 | Ferguson | Nov. 3, 1953 |
| 2,803,551 | Helgren | Aug. 20, 1957 |